Oct. 11, 1949.                H. F. SCHULTZ                2,484,751
                               TRAILER HITCH
Filed Sept. 27, 1948                                    2 Sheets-Sheet 1
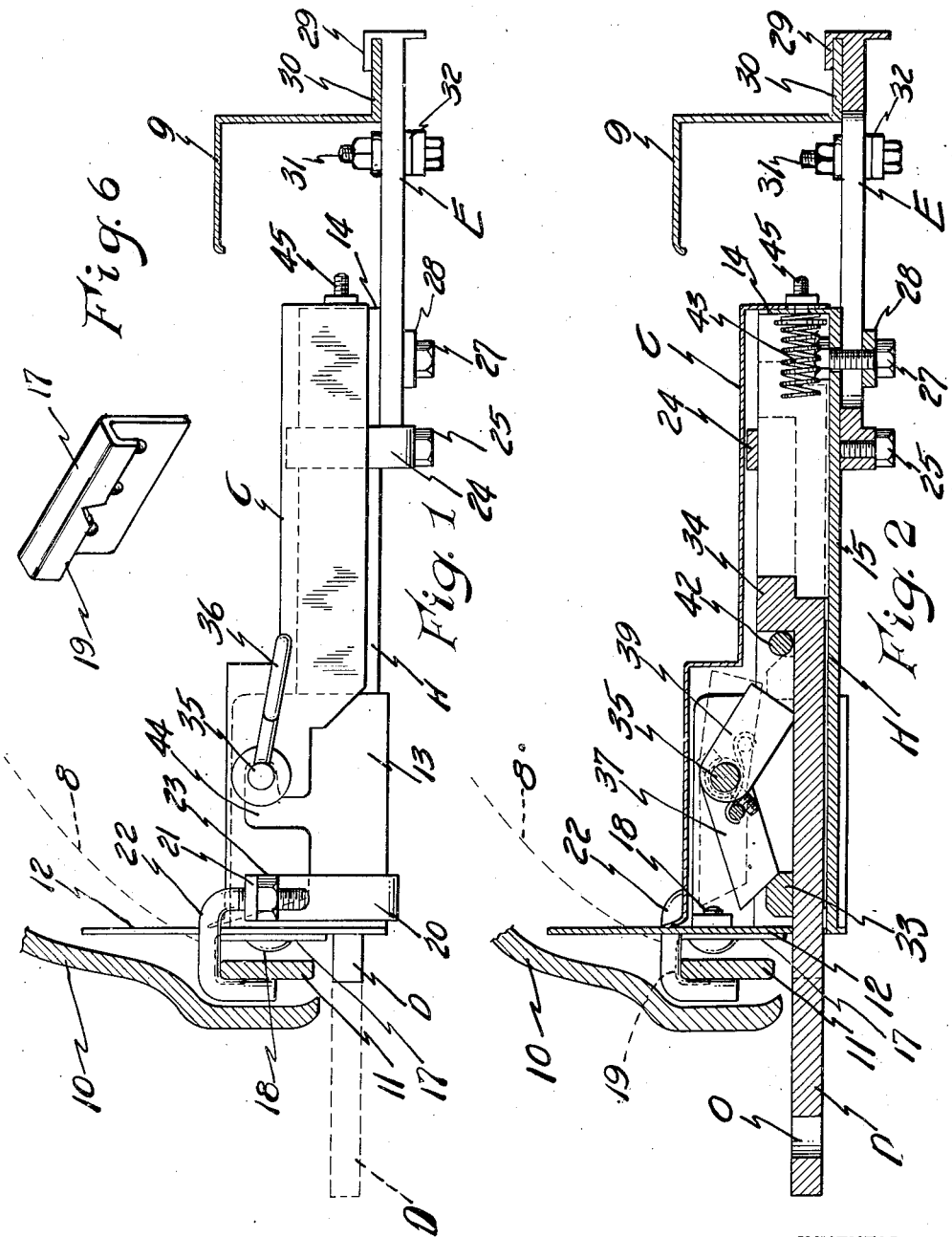
INVENTOR.
Henry F. Schultz
BY
Frank C. Fearman
ATTORNEY

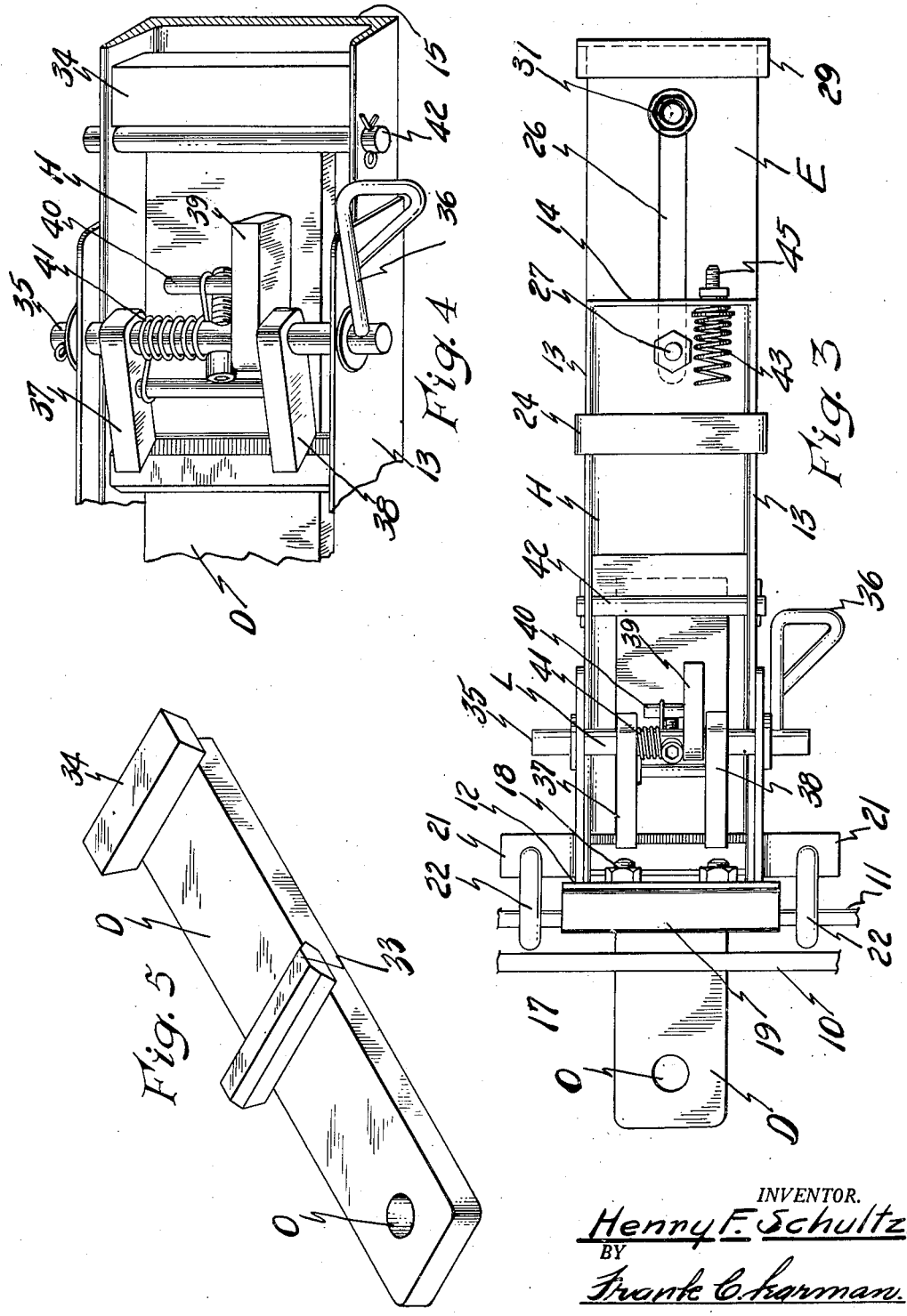

Patented Oct. 11, 1949

2,484,751

UNITED STATES PATENT OFFICE 2,484,751

TRAILER HITCH

Henry F. Schultz, Flushing, Mich.

Application September 27, 1948, Serial No. 51,389

5 Claims. (Cl. 280—33.44)

This invention relates to improvements in trailer hitches for automobiles and similar vehicles, and more specifically to hitches of the extensible draw-bar type, which when not in use, can be retracted beneath the vehicle body and completely concealed from view.

One of the prime objects of the invention is to provide a trailer hitch of simple, practical and rugged construction, which is inexpensive to manufacture and install, and which requires a minimum of adjustment when coupling a trailer or other vehicle to be drawn.

Another object of the invention is to provide a hitch assembly including a housing having a draw-bar slidably and adjustably mounted therein, including means for locking the draw-bar in extended or retracted position, together with resilient means in said housing to eliminate rattling when said bar is in its retracted position.

A further object is to design a hitch, housing and draw-bar including a cover fitted thereover to exclude dirt, mud, or other foreign matter, thus eliminating any possibility of binding or clogging, and further insuring easy operation of the draw-bar to its extended or retracted position.

A further object still is to provide a hitch which can be attached to different makes of automobiles, and in which the draw-bar retracts to position beneath or flush with the edge of the bumper when not in use.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side-elevational view showing my improved hitch in position on an automobile, the vehicle body frame, bumper etc., being shown in section, the broken lines showing the draw-bar in extended position.

Fig. 2 is a sectional, side-elevational view with the draw-bar locked in extended position.

Fig. 3 is a top, plan view showing the hitch with the hood or cover removed.

Fig. 4 is an enlarged, fragmentary, isometric view showing the draw-bar locking mechanism.

Fig. 5 is an isometric view of the draw-bar proper.

Fig. 6 is a perspective view of the housing support.

Referring now more in detail to the drawings, in which I have shown the preferred embodiment of my invention, the numeral 8 indicates the body line of a conventional automobile, and 9 the frame cross member, with bumper and bumper bars 10 and 11 respectively, disposed in the rear of the body as usual, the hitch housing H being mounted beneath the body and is connected to the frame and bumper bars 9 and 11 in a manner to be hereinafter more fully described.

The housing H can be cast or stamped as desired, and is preferably rectangular in shape, and comprises front, side, rear, and bottom walls 12, 13, 14, and 15 respectively, the front wall being formed with a plurality of spaced-apart openings (not shown) to adjustably accommodate an angular-shaped support 17 which is secured thereto by bolts 18, the turned end 19 of which hooks over the bumper bar 11 and serves to support the front end of the housing in position.

A U-shaped stirrup hanger 20 is fitted to and forms a hanger for the front end of the housing and is formed with laterally projecting ears 21 in which the angularly shaped hook bolts 22 are mounted, the free hook ends of said bolts hooking over the bumper bar 11, and nuts 23 are provided for tightening the bolts and securing the housing in position.

An extensible member E is slidably mounted on the rear end of the housing, and comprises a strap 24 formed integral with said plate, and a set-screw 25 is provided as shown for securing it in set position. A longitudinally disposed slot 26 is provided in the plate E and a bolt 27 is mounted in said slot and extends into said housing, a knurled washer 28 being provided on the bolt to eliminate slippage etc.

An overhanging lip 29 is provided on the free end of the member E and engages the leg 30 of the frame cross member 9 to firmly support and secure the inner end of the housing. In the different makes of automobiles, the cross-members 9 will vary in both size and shape, and I therefore provide a bolt 31 in the slot 26 so that it may be longitudinally shifted to assist in clamping the housing in position when found necessary or desirable.

The draw-bar D is slidably mounted in the housing H and is extensible and retractable as will be later described; transversely disposed cross bars 33 and 34 respectively are welded or otherwise secured to the face of the draw-bar, these cross bars projecting beyond the edges as shown to center the draw-bar in the housing, and eliminates binding and friction, and an opening 34 is provided adjacent the outer end of the draw-bar to facilitate the mounting of the ball bolt (not shown) therein.

A locking member L is provided on the housing sidewalls adjacent the front end thereof, and comprises a transversely disposed pin 35 having a manually operable crank or handle 36 provided on one end thereof, and spaced-apart connected jaw members 37 and 38 are mounted on said pin, and extend toward the front end of the housing, a similar jaw 39 being also provided on the pin and extends towards the inner end of the housing.

A laterally projecting pin 40 is provided in the jaws 39, and a spring 41 is anchored to said pin and to the jaws 37 and 38, and tend to force the jaws downwardly and into engagement with the draw-bar, these jaws engaging the cross bar 33 when the draw-bar is extended and prevent inward movement thereof when the trailer surges when backing up, or when for any reason there is an inward pressure on the draw-bar. A transversely disposed pin 42 spans the housing and the cross bar 34 engages therewith when the draw-bar is extended.

When it is desired to retract the draw-bar, the crank 36 is swung up to disengage the cross bar 33, and it can then be forced inwardly to position shown in solid lines in Fig. 1 of the drawings, the end of the bar engaging the spring 43 which is mounted on the end wall 14 of the housing, and the jaw 39 engages the bar 33 to lock it in retracted position and prevent rattle and noise.

A sheet metal cover C forms a closure for the open top of the housing, and is formed with L-shaped slots 44 in the side walls to accommodate the pin 35; the rear end of the cover can also be slotted to accommodate the bolt 45 which anchors the spring 43 in position.

To extend the draw-bar, the operator swings the handle 36 upwardly to disengage the jaw 39, and the draw-bar can then be pulled outwardly until the jaws 37 and 38 engage the edge of the cross bar 33, all as clearly shown in Fig. 2 of the drawings, the bar projecting beyond the vehicle bumper so that it is readily attachable to a trailer (not shown).

To retract the draw-bar, the handle 36 is swung to disengage the bar 33, and the draw-bar can then be pushed inwardly into the housing and to position as shown in Fig. 1 of the drawing.

This design and arrangement makes it possible to conceal the draw-bar from view when it is not in use, and there is no snagging on other car bumpers when parking. The movement or travel of the braw-bar assists in connecting to a trailer, and the entire assembly is easy to mount and economical to manufacture and assemble.

From the foregoing description, it will be obvious that I have perfected a simple, practical and rugged hitch mounted beneath the body and concealed from view, and in which the draw-bar is readily extensible or retractable as desired.

What I claim is:

1. A trailer hitch of the character described, comprising an elongated housing including a vertically disposed connecting plate adjustably secured to the front end wall thereof and adapted to hook over an automobile bumper bar, an extensible plate slidably mounted on said housing and engageable with the cross member of the vehicle frame, a draw-bar adjustably mounted in the housing, and manually operable, spring-tensioned locking means mounted on said housing and engageable with said bar to secure it in extended and adjusted positions, and means for limiting outward movement of said draw-bar.

2. The combination set forth in claim 1 in which resilient means is provided on the rear wall of the housing for engagement with the end of the draw-bar when it is moved to retracted position, and a jaw on the locking means and engageable with the draw-bar for securing it in its retracted position.

3. The combination defined in claim 1 in which a stirrup hanger embraces the forward end of the housing, and bolts adjustably secured to said hanger and provided with hook-shaped ends for engagement with the bumper bar.

4. The combination defined in claim 1 in which an extension plate is adjustably secured to the housing, and an overhanging lip on the outer free end of said plate for engagement with the cross member of the vehicle frame.

5. A trailer hitch of the class described and adapted to be concealed from view beneath a vehicle body comprising an elongated housing, a stirrup hanger embracing the front end of the housing and attached to the vehicle bumper bar, a longitudinally slotted extensible plate on the rear end of the housing and attachable to the vehicle frame, a bolt in the bottom of the housing and extending through said slot, a draw-bar slidably mounted in said housing and adjustable to extended and retracted positions, means for securing the draw-bar in adjusted positions, a spring-tensioned locking mechanism on the housing and engageable with the draw-bar to secure it in extended and retracted positions, and a detachable cover forming a closure for the open top of the housing.

HENRY F. SCHULTZ.

REFERENCES CITED

The following references are of record in the file of this patent:

UNITED STATES PATENTS

| Number | Name | Date |
| --- | --- | --- |
| 2,097,006 | Weis | Oct. 26, 1937 |
| 2,309,850 | Klawitter | Feb. 2, 1943 |
| 2,425,838 | Schultz | Aug. 19, 1947 |